United States Patent
Sakano

(10) Patent No.: US 9,638,594 B2
(45) Date of Patent: May 2, 2017

(54) DISPLACEMENT DETECTION TYPE SIX-AXIS FORCE SENSOR

(71) Applicant: FANUC CORPORATION, Yamanashi (JP)

(72) Inventor: Tetsuro Sakano, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 14/867,080

(22) Filed: Sep. 28, 2015

(65) Prior Publication Data

US 2016/0091376 A1    Mar. 31, 2016

(30) Foreign Application Priority Data

Sep. 30, 2014 (JP) ................................. 2014-201822

(51) Int. Cl.
*G01L 5/16* (2006.01)

(52) U.S. Cl.
CPC .................... *G01L 5/165* (2013.01)

(58) Field of Classification Search
CPC ...................................... G01L 5/165
See application file for complete search history.

(56) References Cited

U.S. PATENT DOCUMENTS

| 4,320,392 A * | 3/1982 | Giovinazzo | B25J 13/085 |
| | | | 200/6 A |
| 4,719,538 A * | 1/1988 | Cox | G01D 5/2417 |
| | | | 361/283.2 |
| 5,406,848 A * | 4/1995 | Okada | G01L 1/144 |
| | | | 73/514.32 |

(Continued)

FOREIGN PATENT DOCUMENTS

| JP | 5657910 A | 5/1981 |
| JP | 643532 A | 1/1989 |

(Continued)

OTHER PUBLICATIONS

English Abstract for Japanese Publication No. 4271475 B2, published Mar. 6, 2009, 2 pgs.

(Continued)

*Primary Examiner* — Lisa Caputo
*Assistant Examiner* — Tran M Tran
(74) *Attorney, Agent, or Firm* — Fredrikson & Byron, P.A.

(57) ABSTRACT

A six-axis force sensor including a fixed part; a first movable part; a first connecting part connecting the first movable part to the fixed part in an elastically displaceable manner; a second movable part; a second connecting part connecting the second movable part to the first movable part in an elastically displaceable manner; a first detecting section detecting a displacement of the first movable part relative to the fixed part; and a second detecting section detecting a displacement of the second movable part relative to the first movable part. The six-axis force sensor enables, in a three-axis rectangular coordinate system, a detection of force components in first axis, second axis and third axis directions, and moment components about the first axis, the second axis and the third axis, of a force applied to the second movable part, with reference to detection values of the first and second detecting sections.

12 Claims, 6 Drawing Sheets

(56) References Cited

U.S. PATENT DOCUMENTS

| | | | | |
|---|---|---|---|---|
| 5,531,002 | A * | 7/1996 | Okada | G01L 1/144 29/25.41 |
| 5,962,787 | A * | 10/1999 | Okada | G01P 15/18 73/514.16 |
| 6,053,057 | A * | 4/2000 | Okada | G01L 1/144 73/862.043 |
| 6,159,761 | A * | 12/2000 | Okada | G01P 15/0802 438/462 |
| 6,990,867 | B2 * | 1/2006 | Okada | G01L 5/165 73/780 |
| 7,121,147 | B2 * | 10/2006 | Okada | G01L 5/165 73/760 |
| 7,437,954 | B2 * | 10/2008 | Sakano | G01L 5/161 73/862.043 |
| 7,578,162 | B2 * | 8/2009 | Okada | G01L 1/148 73/1.38 |
| 7,594,445 | B2 * | 9/2009 | Hirabayashi | G01L 1/26 73/862.041 |
| 7,757,571 | B2 * | 7/2010 | Hirabayashi | G01L 1/26 73/862.041 |
| 7,938,028 | B2 * | 5/2011 | Hirabayashi | G01L 1/26 73/754 |
| 8,156,823 | B2 * | 4/2012 | Kim | G01L 5/16 73/862.041 |
| 8,965,577 | B2 * | 2/2015 | Arimitsu | G01L 5/166 700/258 |
| 9,112,385 | B2 * | 8/2015 | Sakano | H02K 7/00 |
| 9,200,969 | B2 * | 12/2015 | Ueno | G01L 5/16 |
| 9,366,587 | B2 * | 6/2016 | Nagura | G01B 9/02028 |
| 9,383,277 | B2 * | 7/2016 | Okada | G01L 1/142 |
| 2001/0005325 | A1 | 6/2001 | Kitayama et al. | |
| 2011/0005325 | A1 | 1/2011 | Yang | |

FOREIGN PATENT DOCUMENTS

| | | |
|---|---|---|
| JP | H01119731 A | 5/1989 |
| JP | 1078360 A | 3/1998 |
| JP | 2004301731 A | 10/2004 |
| JP | 2008292510 A | 12/2008 |
| JP | 4271475 B2 | 3/2009 |
| JP | 2012237570 A | 12/2012 |
| JP | 2014085310 A | 5/2014 |
| JP | 2014106174 A | 6/2014 |

OTHER PUBLICATIONS

English Abstract for Japanese Publication No. 2014-106174 A, published Jun. 9, 2014, 1 pg.
English Abstract for Japanese Publication No. 2014-085310 A, published May 12, 2014, 1 pg.
English Abstract for Japanese Publication No. 2012-237570 A, published Dec. 6, 2012, 1 pg.
English Abstract for Japanese Publication No. 2008-292510 A, published Dec. 4, 2008, 1 pg.
English Abstract for Japanese Publication No. 10-078360 A, published Mar. 24, 1998, 1 pg.
English Abstract for Japanese Publication No. 64-003532 A, published Jan. 9, 1989, 1 pg.
English Translation of Abstract for Japanese Publication No. 2004301731, published Oct. 28, 2004, 1 page.
English Translation of Abstract for Japanese Publication No. H01119731, published May 11, 1989, 1 page.
Office Action in relation to Japanese Patent Application No. 2014-20188 mailed Nov. 24, 2015, including English translation of the Japanese Office Action "as a concise explanation of relevance," 5 pages.
Decision to Grant a Patent mailed by Japanese Patent Office, Mar. 8, 2016, 3 pages.
English Machine translation of Decision to Grant a Patent mailed by Japanese Patent Office, Mar. 8, 2016, 3 pages.
Notification of Reasons for Refusal mailed by Japanese Patent Office, Nov. 24, 2015, 3 pages.
English Machine translation of Notification of Reasons for Refusal mailed by Japanese Patent Office, Nov. 24, 2015, 3 pages.

* cited by examiner

DISPLACEMENT DETECTION TYPE SIX-AXIS FORCE SENSOR

BACKGROUND OF THE INVENTION

1. Field of the Invention

The present invention relates to a displacement detection type six-axis force sensor.

2. Description of the Related Art

A displacement detection type force sensor is configured to detect, when a force (or load) is applied to a sensor body, a displacement of the sensor body accompanying the deformation of the sensor body caused by the applied force and thereby detect the force based on the detected displacement. For example, Japanese Patent No. 4271475 (JP4271475B2) discloses a force sensor that detects a displacement by detecting a change in capacitance provided at a predetermined position on a sensor body. The force sensor includes an outer box-like structure and an inner box-like structure, wherein the side and top surfaces of the outer box-like structure and the side and top surface of the inner box-like structure are arranged so as to oppose each other to form a gap continuously extending throughout the sensor body. A plurality of pairs of electrodes are respectively arranged at predetermined locations in the gap in such a manner that the electrodes of each pair are opposed to each other in a direction of any one axis of a three-axis rectangular coordinate system, so as to form capacitance between the opposing electrodes of each pair (i.e., to form a capacitor). When the outer box-like structure is deformed by a force (or load), the shape and dimensions of the gap change correspondingly, and the capacitance between the respective opposing electrodes changes. From this change in capacitance, a displacement of the outer box-like structure relative to the inner box-like structure is calculated, and, based on the calculated displacement, a force component in each axis direction and a moment component about each axis, of the force applied to the outer box-like structure, can be detected.

SUMMARY OF THE INVENTION

In a displacement detection type six-axis force sensor that detects a force component in each axis direction and a moment component about each axis in a three-axis rectangular coordinate system, it is desired to provide a structure that can detect a displacement of each of six axes with high accuracy, and to simplify the structure and thereby facilitating the processing and assembly of constituent parts and achieving a reduction in fabrication cost.

One aspect of the present invention is a six-axis force sensor that includes a fixed part; a first movable part; a first connecting part configured to connect the first movable part to the fixed part so that the first movable part is able to be elastically displaced in a direction parallel to a first axis, a direction parallel to a second axis orthogonal to the first axis, and a rotational direction about a third axis orthogonal to both the first axis and the second axis, in a three-axis rectangular coordinate system; a second movable part; a second connecting part configured to connect the second movable part to the first movable part so that the second movable part is able to be elastically displaced in a rotational direction about the first axis, a rotational direction about the second axis and a direction parallel to the third axis, in the three-axis rectangular coordinate system; a first detecting section configured to detect a displacement of the first movable part relative to the fixed part; and a second detecting section configured to detect a displacement of the second movable part relative to the first movable part; wherein the six-axis force sensor enables a detection of a force component in a direction of the first axis, a force component in a direction of the second axis, a force component in a direction of the third axis, a moment component about the first axis, a moment component about the second axis and a moment component about the third axis, of a force applied to the second movable part, with reference to a detection value of the first detecting section and a detection value of the second detecting section.

According to the six-axis force sensor of the above aspect, since the respective displacements in six axes can be detected by the first and second detecting sections with one detecting section sharing a detection in relation to three degrees of freedom with the other detecting section, the displacements are able to be detected with high accuracy. Since each of the constituent part that causes the displacement to be detected by the first detecting section and the constituent part that causes the displacement to be detected by the second detecting section may have a configuration that allows displacements with only three degrees of freedom, and since the first movable part is common to both constituent parts, the structure of the six-axis force sensor is simplified, the processing and assembly of the components are facilitated, and a reduction in fabrication cost is achieved.

DETAILED DESCRIPTION

Figure 1:
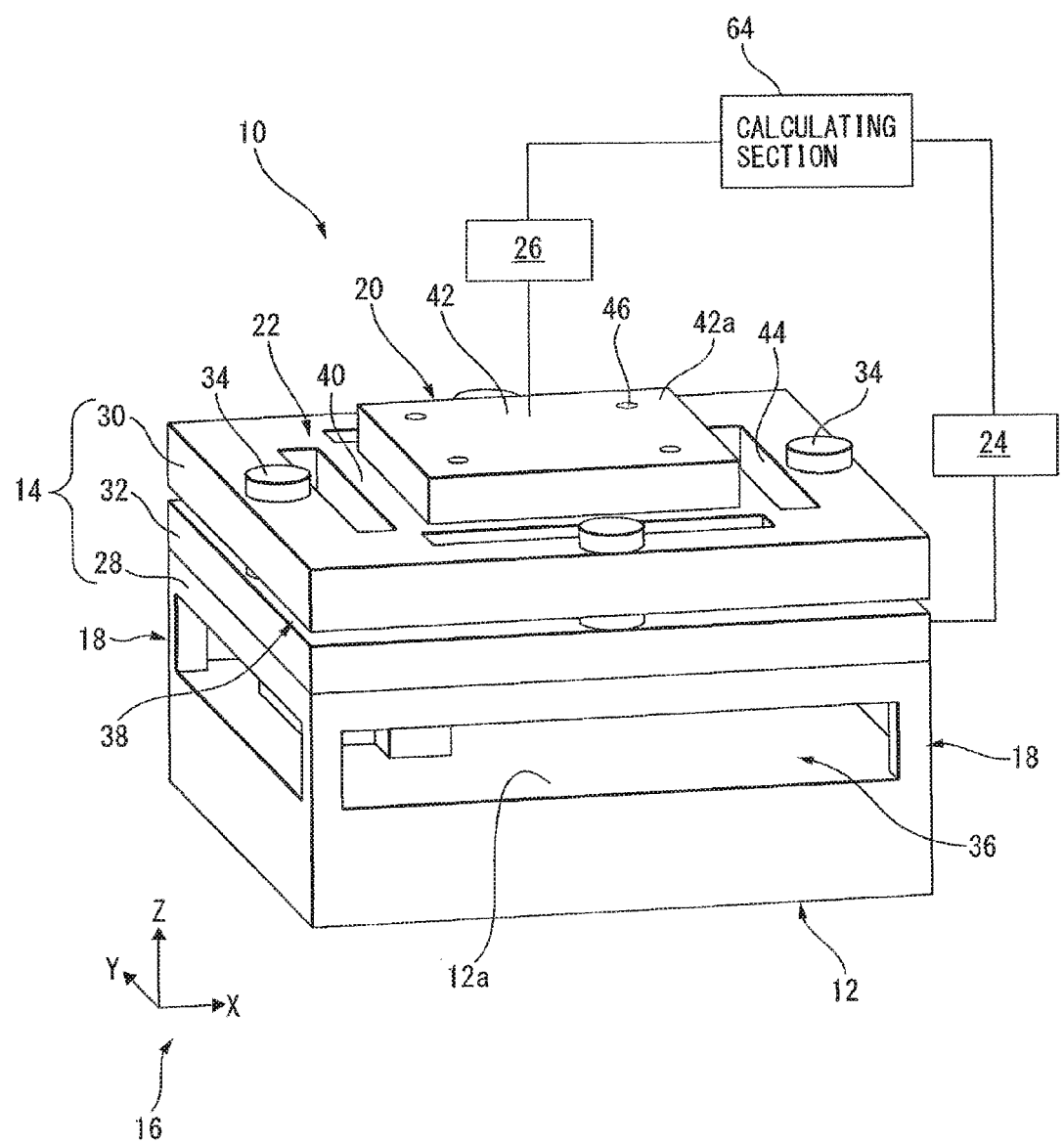
FIG. 1 is a perspective view showing in conceptual form the construction of a six-axis force sensor according to a first embodiment.

Embodiments of the present invention will be described below with reference to the accompanying drawings. Throughout the drawings, corresponding component elements are designated by like reference numerals.

Figure 2:
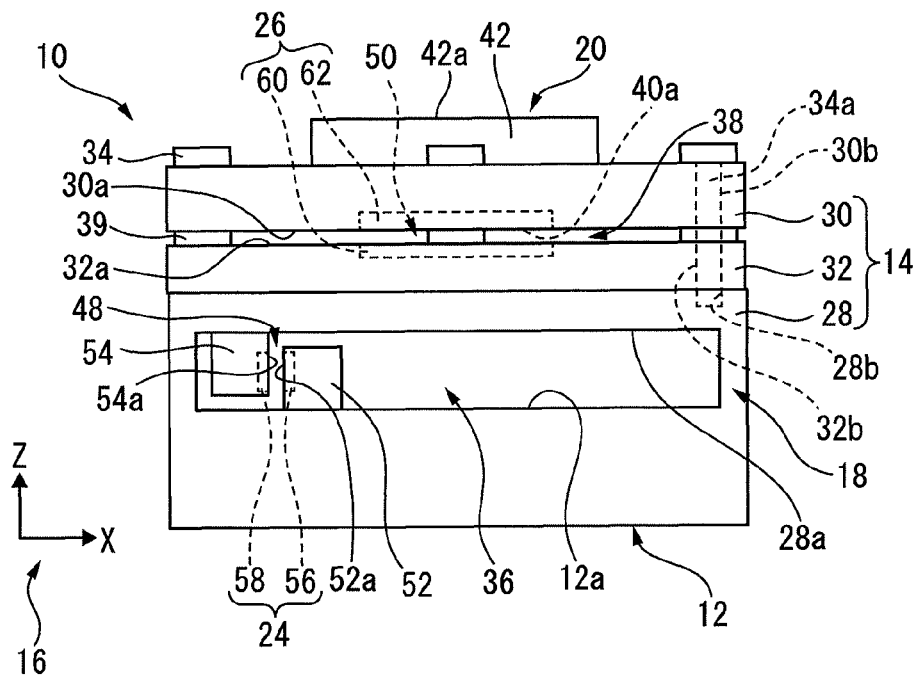
FIG. 2 is a front view of the six-axis force sensor of FIG. 1.
Figure 3:
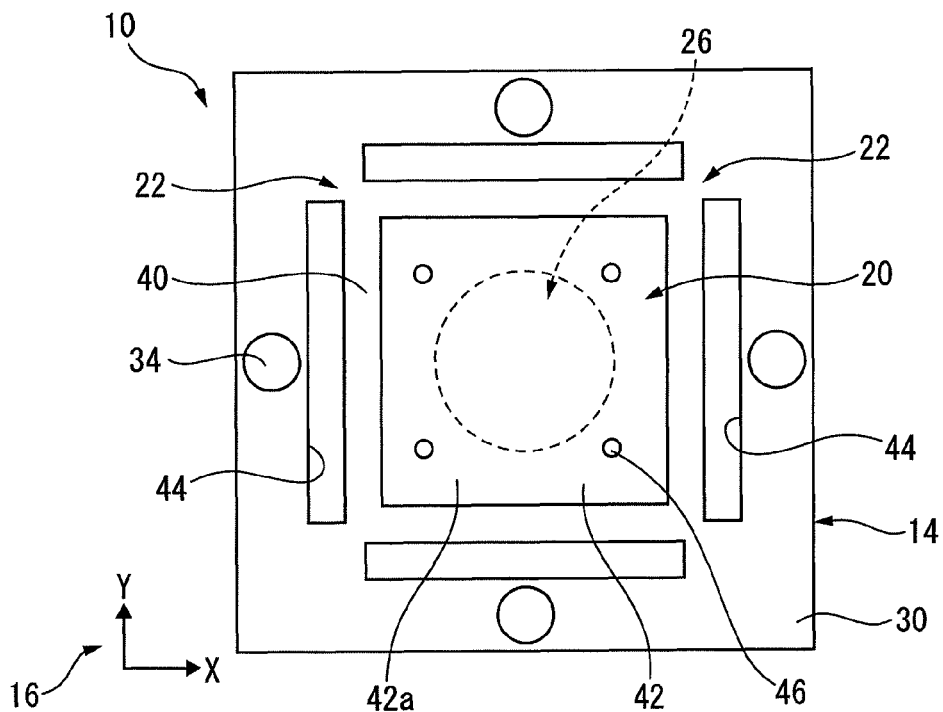
FIG. 3 is a top plan view of the six-axis force sensor of FIG. 1.

FIGS. 1 to 3 show a six-axis force sensor 10 according to a first embodiment. The six-axis force sensor 10 includes a fixed part 12; a first movable part 14; a first connecting part 18 configured to connect the first movable part 14 to the fixed part 12 so that the first movable part 14 is able to be elastically displaced in a direction parallel to a first axis (X axis, in the drawing), a direction parallel to a second axis (Y axis, in the drawing) orthogonal to the first axis, and a rotational direction about a third axis (Z axis, in the drawing) orthogonal to both of the first axis and the second axis, in a three-axis rectangular coordinate system 16; a second movable part 20; a second connecting part 22 configured to connect the second movable part 20 to the first movable part 14 so that the second movable part 20 is able to be elastically displaced in a rotational direction about the first axis (X axis), a rotational direction about the second axis (Y axis) and a direction parallel to the third axis (Z axis), in the three-axis rectangular coordinate system 16; a first detecting section 24 configured to detect a displacement of the first movable part 14 relative to the fixed part 12; and a second detecting section 26 configured to detect a displacement of the second movable part 20 relative to the first movable part 14.

The fixed part 12 is a base element that is fixed directly or indirectly to a machine or structure such as a robot arm (not shown; hereinafter referred to as a machinery), when the force sensor 10 is mounted on the machinery. The second movable part 20 is a force receiving element that is attached to an object such as a robot hand (not shown; hereinafter referred to as a force generator) generating a force (or load) to be detected by the force sensor 10, and is configured to receive the force to be detected. The force (or load) applied from the force generator to the second movable part 20 is then applied from the second movable part 20 to the second connecting part 22 and thereby elastically deforms the second connecting part 22, and at the same time the applied force causes the second movable part 20 to be elastically displaced relative to the first movable part 14 either in one direction or in a combination of two or more directions, primarily from among the rotational direction about the first axis (X axis), the rotational direction about the second axis (Y axis), and the direction parallel to the third axis (Z axis). The second detecting section 26 detects the displacement, in each axis, of the second movable part 20 relative to the first movable part 14, which accompanies the elastic deformation of the second connecting part 22. Further, the force applied from the second movable part 20 to the second connecting part 22 is transmitted from the second connecting part 22 to the first movable part 14, and is then applied from the first movable part 14 to the first connecting part 18 and thereby elastically deforms the first connecting part 18, and at the same time the applied force causes the first movable part 14 to be elastically displaced relative to the fixed part 12 either in one direction or in a combination of two or more directions, primarily from among the direction parallel to the first axis (X axis), the direction parallel to the second axis (Y axis), and the rotational direction about the third axis (Z axis). The first detecting section 24 detects the displacement, in each axis, of the first movable part 14 relative to the fixed part 12, which accompanies the elastic deformation of the first connecting part 18.

In the embodiment of FIGS. 1 to 3, the fixed part 12 has a shape of a rectangular parallelepiped, and is provided, at each of four corners of a rectangular planar surface 12a extending along a virtual plane (X-Y plane) defined by the first and second axes, with the first connecting part 18 having a columnar shape and extending in a direction parallel to the third axis (Z axis). The first movable part 14 includes a rectangular flat plate-shaped first portion 28, a rectangular frame-shaped second portion 30, and a rectangular flat plate-shaped third portion 32 interposed between the first portion 28 and the second portion 30. The first portion 28 and the third portion 32 are formed separately from each other and integrally fastened together. Further, the second portion 30 and the third portion 32 are formed separately from each other and integrally fastened together. The fastening of the first and third portions 28 and 32 and the fastening of the second and third portions 30 and 32 may be accomplished by tightening them together by a bolt 34 commonly used for both fastenings (FIG. 2). Alternatively, the fastening of the first and third portions 28 and 32 and the fastening of the second and third portions 30 and 32 may be accomplished by fastening means, such as bolts, separately used for respective fastenings.

The first portion 28 has an outer shape of a rectangular parallelepiped, which is identical, in a plan view (i.e., when viewed from above along Z-axis in the drawing), to the shape of the fixed part 12, and includes a rectangular planar surface 28a (FIG. 2) that faces the surface 12a of the fixed part 12 with a space 36 defined therebetween. Each of four first connecting parts 18 is connected, at an end (an upper end in the drawing) opposite to an end (a lower end in the drawing) joined to the fixed part 12, to one of four corners of the surface 28a of the first portion 28. In the present embodiment, the fixed part 12, the first connecting parts 18 and the first portion 28 are integrally formed from a material identical to each other, and constitute a unitary structure having an appearance like a rectangular parallelepiped.

The third portion 32 has an outer shape of a rectangular parallelepiped, which is identical, in a plan view (i.e., when viewed from above along Z-axis in the drawing), to the shape of the first portion 28, and is fastened to the first portion 28 with their profiles registered with each other. The third portion 32 includes a rectangular planar surface 32a (FIG. 2) on a side opposite to the surface 28a of the first portion 28. The second portion 30 has a rectangular outer shape identical, in a plan view (i.e., when viewed from above along Z-axis in the drawing), to the shape of the third portion 32, and is fastened to the third portion 32 with their profiles registered with each other. The second portion 30 includes a rectangular frame-like planar surface 30a (FIG. 2) that faces the surface 32a of the third portion 32 with a space 38 defined therebetween.

In the present embodiment, four through-holes 30b are formed at the respective centers of four portions of the rectangular frame-like second portion 30, which correspond to four sides of a rectangle, and shanks 34a of the bolts 34 are inserted into the respective through-holes 30b. The shank 34a of each bolt 34 passes through one of through-holes 32b formed in the third portion 32 at positions corresponding to the through-holes 30b of the second portion 30, and an external thread of the shank 34a is threaded into one of threaded holes 28b formed in the first portion 28 at corresponding positions. In this way, the first portion 28, the second portion 30 and the third portion 32 are integrally connected together. In the present embodiment, the first portion 28, the second portion 30 and the third portion 32 are formed from materials identical to or different from each other, and are integrally fastened together so as to present an appearance like a rectangular parallelepiped.

A spacer 39 is inserted between the second portion 30 and the third portion 32 (FIG. 2). In the present embodiment, four annular spacers 39 with center holes are interposed between the second portion 30 and the third portion 32 with the shank 34a of each bolt 34 inserted through one of the center holes. The spacer 39 has a predetermined thickness which defines the dimension of the space 38 in the third axis (Z axis) direction. Instead of the spacer 39 as an independent part, a protrusion protruding to a predetermined height may be provided on the surface 30a of the second portion 30 or the surface 32a of the third portion 32, so as to define the dimension of the space 38.

Each of four first connecting parts 18 acts as an elastic beam interposed between the fixed part 12 and the first portion 28 of the first movable part 14 and extending in parallel to the third axis (Z axis) in an undeformed condition. The first connecting part 18 acting as the elastic beam is not easily deformed (i.e., does not easily elongated or contracted) by a force applied in a direction parallel to the third axis (Z axis), but is elastically bent in much the same way as an inclining of a column, by a force applied in a direction parallel to the first axis (X axis), a force applied in a direction parallel to the second axis (Y axis), or a force applied in a rotational direction about the third axis (Z axis). Due to the above function of the first connecting part 18, the first movable part 14 is not easily displaced in the direction parallel to the third axis (Z axis), but is allowed to be elastically displaced in the direction parallel to the first axis (X axis), the direction parallel to the second axis (Y axis) and the rotational direction about the third axis (Z axis), relative to the fixed part 12. In a condition where none of the first connecting parts 18 are bent, the surfaces 28a, 30a and 32a of the first movable part 14 are disposed parallel to the virtual plane (X-Y plane) defined by the first and second axes.

In the above embodiment, the first connecting parts 18 are disposed at four corners of the surface 12a of the fixed part 12, but instead, may be provided at the respective centers of four portions near the periphery of the rectangular surface 12a, which correspond to four sides of a rectangle. If the fixed part 12 and the first movable part 14 have an appearance like a circular plate instead of the illustrated appearance like a rectangular parallelepiped, three first connecting parts 18 may be formed, for example, at positions respectively spaced at a central angle of 120 degrees. The fixed part 12 and the first movable part 14 may have various appearances, and a desired number of first connecting parts 18 may be formed at desired positions depending on the appearances. In this connection, it is preferable to form the first connecting parts 18 at positions permitting the surface 28a of the first movable part 14 to be maintained substantially in parallel to the surface 12a of the fixed part 12 during the displacement motion of the first movable part 14 relative to the fixed part 12. Each first connecting part 18 may have the shape of an illustrated square column or any other shape such as a cylindrical or polygonal column. Further, each first connecting part 18 may have a uniform thickness throughout its length as illustrated, or may have a shape locally thinner or thicker at a longitudinal center or one longitudinal end, or a shape combining a plurality of curved faces. Thus, the first connecting part 18 may have various configurations, provided that it permits the first movable part 14 to be elastically displaced with aforementioned three degrees of freedom relative to the fixed part 12.

In the embodiment of FIGS. 1 to 3, the second movable part 20 includes a base-plate portion 40 having a shape of a rectangular parallelepiped, and a protruding portion 42 having a shape of a rectangular parallelepiped and protruding from the base-plate portion 40 (FIGS. 1 and 3). The base-plate portion 40 has an outer shape similar to, but slightly larger than, the protruding portion 42 in a plan view (i.e., when viewed from above along Z axis, in the drawing), and provided with the second connecting parts 22 respectively at four corners of a region extending laterally beyond the periphery of the protruding portion 42. The base-plate portion 40 has an outer shape similar to, but smaller than, the rectangular frame-like second portion 30 of the first movable part 14 in a plan view (i.e., when viewed from above along Z axis in the drawing) and a thickness (a dimension measured along Z axis, in the drawing) identical to the second portion 30, and is disposed at a position surrounded by the second portion 30. The base-plate portion 40 has a rectangular planar surface 40a (FIG. 2) on the side (lower side, in the drawing) same as the surface 30a of the second portion 30, and the protruding portion 42 is formed on the side (upper side, in the drawing) opposite to the surface 40a. Between the base-plate portion 40 and the second portion 30, slits 44 (FIGS. 1 and 3) are formed to extend in the direction of the first axis (X axis) or the second axis (Y axis), along the outer edges of the base-plate portion 40, which correspond to four sides of a rectangular parallelepiped. Four second connecting parts 22 are provided, each of which is formed between one of a pair of slits 44 extending in the first axis (X axis) direction and one of a pair of slits 44 adjacent to the first pair and extending in the second axis (Y axis) direction (FIG. 3).

Each of four second connecting parts 22 acts as an elastic beam interposed between the second portion 30 of the first movable part 14 and the base-plate portion 40 of the second movable part 20 and extending along the virtual plane (X-Y plane) defined by the first and second axes in an undeformed condition. The second connecting part 22 acting as the elastic beam is not easily deformed (i.e., does not easily elongated or contracted) by a force applied in a direction parallel to the first axis (X axis) or a force applied in a direction parallel to the second axis (Y axis), but is elastically bent in much the same way as an inclining of a column, by a force applied in a direction parallel to the third axis (Z axis), a force applied in a rotational direction about the first axis (X axis), or a force applied in a rotational direction about the second axis (Y axis). Due to the above function of the second connecting part 22, the second movable part 20 is not easily displaced in the direction parallel to the first axis (Z axis) and the direction parallel to the second axis (Y axis), but is allowed to be elastically displaced in the rotational direction about the first axis (X axis), the rotational direction about the second axis (Y axis) and the direction parallel to the third axis (Z axis), relative to the first movable part 14. In a condition where none of the second connecting parts 22 are bent, the surface 40a of the second movable part 20 is disposed parallel to the virtual plane (X-Y plane) defined by the first and second axes.

In the present embodiment, the second portion 30, the second connecting parts 22 and the base-plate portion 40 are integrally formed from a material identical to each other, and constitute a unitary structure having an appearance like a rectangular parallelepiped. A structure including the above unitary structure and the third portion 32 integrally fastened to the second portion 30 by the bolts 34, may also be regarded as a unitary structure. The base-plate portion 40 and the protruding portion 42 may be integrally formed from a material identical to each other, or may be formed separately from each other and integrally fastened together. The protruding portion 42 is provided, in a surface 42a opposite to the surface 40a of the base-plate portion 40, with a plurality of mount holes 46 (FIGS. 1 and 3) used for mounting the force generator.

In the above embodiment, the base-plate portion 40 and protruding portion 42 of the second movable part 20 have an appearance like a rectangular parallelepiped, but may have any other appearance such as a cylindrical or polygonal column. For example, if the second movable part 20 has a cylindrical shape, three slits 44 extending in an arc shape may be formed, one at each of three positions spaced at a central angle of 120 degrees around the second movable part, and three second connecting parts 22 may be respectively formed between the slits 44 adjacent to each other along a circumferential direction. Corresponding thereto, the bolts 34 used for unifying the first movable part 14 may also be provided at three portions located near the centers of the respective arch-shaped slits 44. Further, the base-plate portion 40 and the second portion 30 may be connected to each other at a suitable portion within the slit 44 without interfering with the relative displacement thereof, so as to form a non-penetrating groove, in place of the penetrating slit 44, between the adjacent second connecting parts 22. Alternatively, the second connecting part 22 may be formed to have a diaphragm-like shape extending between the base-plate portion 40 and the second portion 30. The first movable part 14 and the second movable part 20 may have various appearances, and a desired number of second connecting parts 22 may be formed at desired positions accordingly. However, it is preferable to form the second connecting parts 22 at positions where the positional relationship between the surface 40a of the second movable part 20 and the surface 32a of the first movable part 14 does not change along the first axis (X axis) and the second axis (Y axis) during a time when the second movable part 20 is displaced relative to the first movable part 14. Thus, the second connecting parts 22 may essentially be configured to allow the aforementioned elastic displacement with three degrees of freedom of the second movable part 20 relative to the first movable part 14, and thus have various configurations on that condition.

In the embodiment of FIGS. 1 to 3, a first gap 48 having a capacitance is defined between the fixed part 12 and the first movable part 14 (FIG. 2). The first detecting section 24 detects a change in the capacitance of the first gap 48 and thereby detects the displacement of the first movable part 14 relative to the fixed part 12. Also, in the embodiment of FIGS. 1 to 3, a second gap 50 having a capacitance is defined between the first movable part 14 and the second movable part 20 (FIG. 2). The second detecting section 26 detects a change in the capacitance of the second gap 50 and thereby detects the displacement of the second movable part 20 relative to the first movable part 14.

Figure 5:
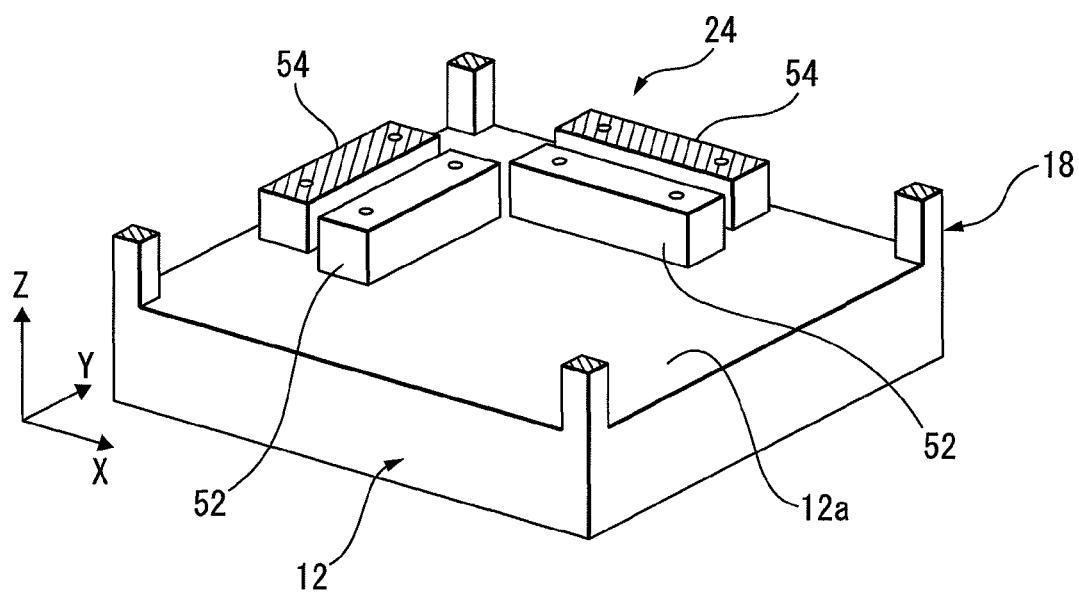
FIG. 5 is a perspective view of the six-axis force sensor cut away along a line V-V in FIG. 4.
Figure 6:
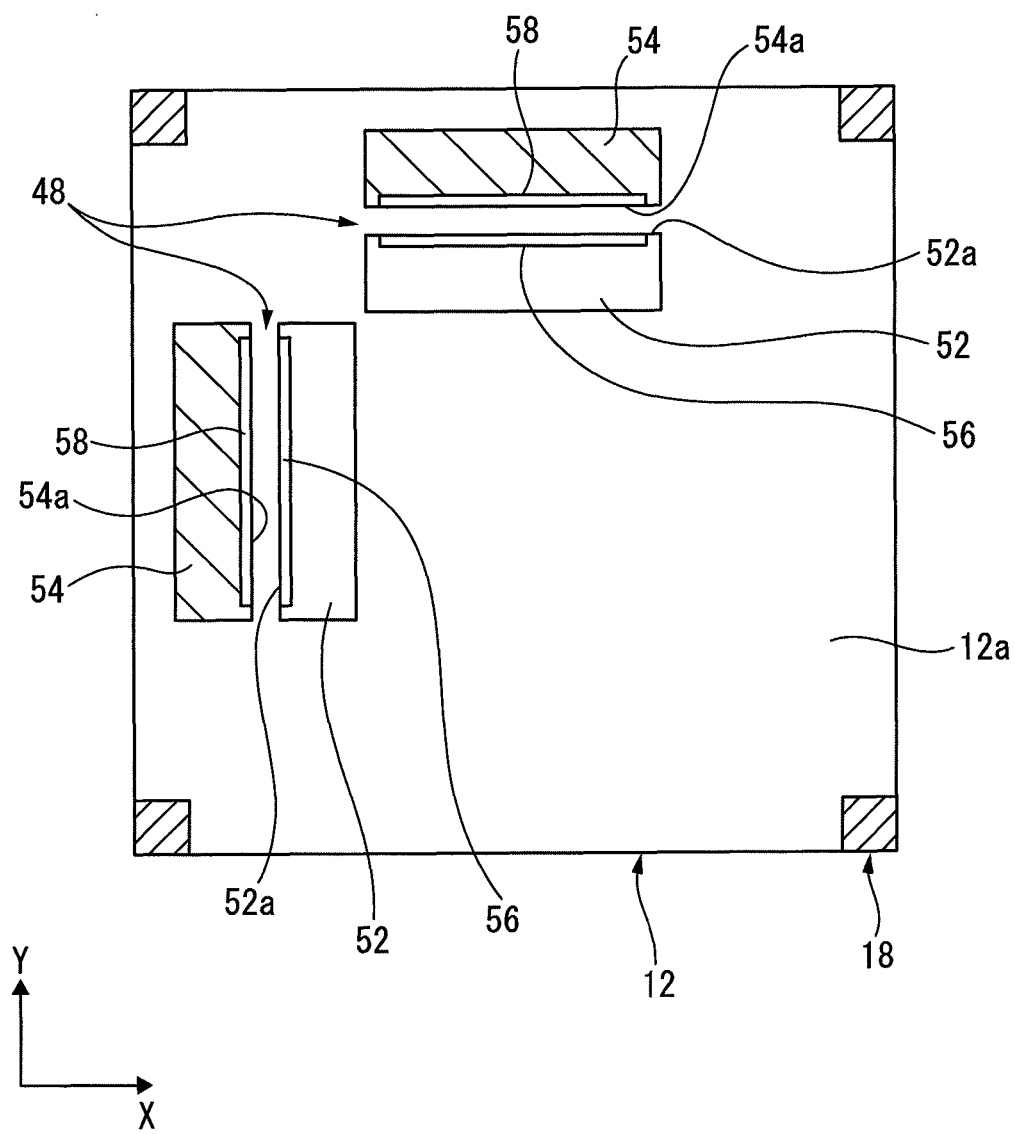
FIG. 6 is a plan view of the six-axis force sensor cut away along a line V-V in FIG. 4.

The configuration of the first detecting section 24 will be described in detail with reference to FIGS. 2 and 4 to 7A. FIGS. 5 and 6 show the six-axis force sensor 10 cut away along a line V-V in FIG. 4.

Figure 4:
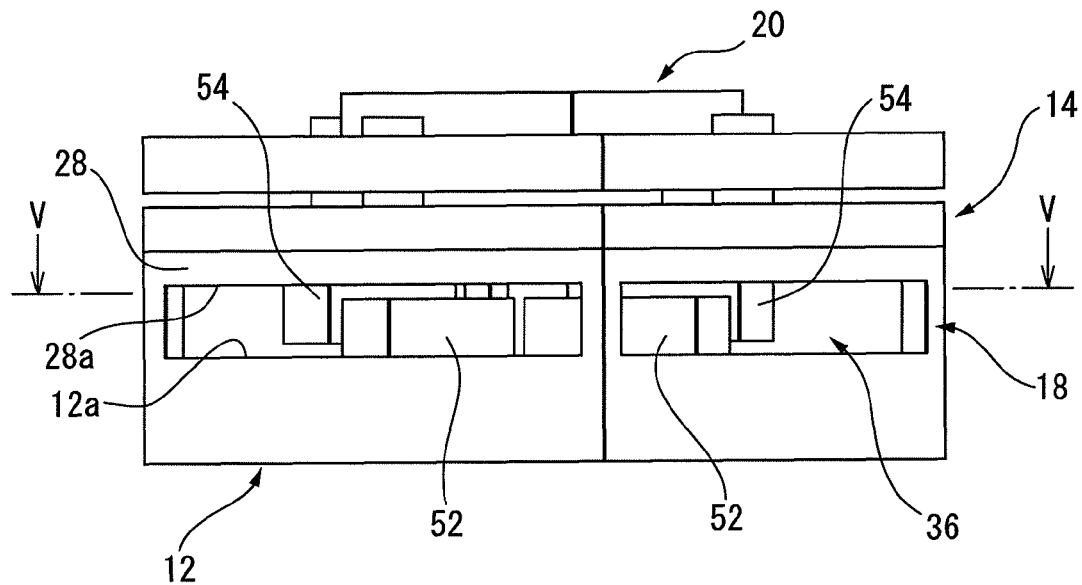
FIG. 4 is a perspective view of the six-axis force sensor of FIG. 1 as viewed from a different direction.

The fixed part 12 includes two fixed blocks 52, each protruding from the surface 12a in the third axis (Z axis) direction (upward, in FIG. 4). Each fixed block 52 has a shape of a rectangular parallelepiped sufficiently smaller than the surface 12a, and is disposed at a predetermined position on the surface 12a within the space 36. One fixed block 52 includes a first fixed surface 52a (FIG. 6) which extends along a virtual plane (X-Z plane) defined by the first and third axes. The other fixed block 52 includes a first fixed surface 52a (FIG. 6) which extends along a virtual plane (Y-Z plane) defined by the second and third axes. Accordingly, the first fixed surface 52a of one fixed block 52 and the first fixed surface 52a of the other fixed block 52 extend in directions intersecting each other at an angle of 90 degrees.

On the other hand, the first movable part 14 includes two movable blocks 54, each protruding from the surface 28a of the first portion 28 in the third axis (Z axis) direction (downward, in FIG. 4). Each movable block 54 has a shape of a rectangular parallelepiped sufficiently smaller than the surface 28a, and is disposed at a predetermined position on the surface 28a within the space 36. One movable block 54 includes a first movable surface 54a that, when none of the first connecting parts 18 are bent, extends along the virtual plane (X-Z plane) defined by the first and third axes. The other movable block 54 includes a first movable surface 54a that, when none of the first connecting parts 18 are bent, extends along the virtual plane (Y-Z plane) defined by the second and third axes. Accordingly, the first movable surface 54a of one movable block 54 and the first movable surface 54a of the other movable block 54 extend in directions intersecting each other at an angle of 90 degrees.

Each of two first movable surfaces 54a is disposed at a position allowing it to face in parallel to one of two first fixed surfaces 52a, which extends along the corresponding virtual plane. When none of the first connecting parts 18 are bent, the first fixed surface 52a and the first movable surface 54a, extending in parallel to the virtual plane (X-Z plane) defined by the first and third axes, face in parallel to each other in the direction of the second axis (Y axis), and the first fixed surface 52a and the first movable surface 54a, extending in parallel to the virtual plane (Y-Z plane) defined by the second and third axes, face in parallel to each other in the direction of the first axis (X axis). The first gap 48 is defined between each of two pairs of the mutually facing first fixed surface 52a and first movable surface 54a. Two first gaps 48 may have a shape and size identical to each other when none of the first connecting parts 18 are bent.

The first detecting section 24 includes a total of at least three capacitance-forming portions that are electrically independent from each other and provided in two first gaps 48. Each capacitance-forming portion is configured from a fixed electrode 56 formed on the first fixed surface 52a of one fixed block 52 and a movable electrode 58 formed on the first movable surface 54a of one opposing movable block 54. The first gap 48 provides electrical insulation between the opposing fixed and movable electrodes 56 and 58. A predetermined capacitance is formed in the first gap 48 by the opposing fixed and movable electrodes 56 and 58.

Figure 7A:
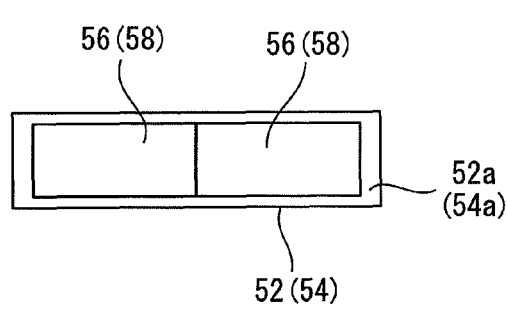
FIG. 7A is a diagram showing the configuration of electrodes, constituting a first detecting section, that can be provided in the six-axis force sensor of FIG. 1.

FIG. 7A shows one exemplary configuration of the fixed electrode 56 formed on the first fixed surface 52a of one fixed block 52, or the movable electrode 58 formed on the first movable surface 54a of one movable block 54. In this example, a pair of fixed electrodes 56, each electrode having a rectangular profile and adjacent to each other in a longitudinal direction, is formed on the first fixed surface 52a of one fixed block 52. The fixed electrodes 56 have a profile identical to each other, and are arranged, in the form of a strip, to be electrically insulated from each other. Likewise, a pair of movable electrodes 58, each having a rectangular profile and adjacent to each other in a longitudinal direction, is formed on the first movable surface 54a of one movable block 54. The movable electrodes 58 have a profile identical to each other, and are arranged to be electrically insulated from each other in the form of a strip. The fixed electrode 56 and the movable electrode 58 have a profile identical to each other. The fixed electrode 56 and the opposing movable electrode 58 are disposed at respective positions allowing the profiles thereof to be registered with each other as seen in the opposing direction, when none of the first connecting parts 18 are bent. A total of four pairs of opposing fixed and movable electrodes 56 and 58 provide a total of four capacitances, two of which is provided in each of two first gaps 48.

In the six-axis force sensor 10 provided with the capacitance-forming portions according to the example of FIG. 7A, when the first movable part 14 is displaced relative to the fixed part 12 in the direction of the first axis (X axis), the first fixed surface 52a and the first movable surface 54a, which oppose each other in the direction of the first axis (X axis), are translated (or subjected to a parallel displacement) relative to each other in a direction toward or away from each other, so as to uniformly decrease or increase the first gap 48. As a result, the capacitances that are respectively provided in two pairs of fixed and movable electrodes 56 and 58 facing each other in the direction of the first axis (X axis), change in a mode corresponding to each other. The first detecting section 24 detects the changes in the corresponding mode in the capacitances, and outputs a detection value representing the displacement of the first movable part 14 relative to the fixed part 12 in the direction of the first axis (X axis). Likewise, when the first movable part 14 is displaced relative to the fixed part 12 in the direction of the second axis (Y axis), the first fixed surface 52a and the first movable surface 54a, which oppose each other in the direction of the second axis (Y axis), are translated (or subjected to a parallel displacement) relative to each other in a direction toward or away from each other, so as to uniformly decrease or increase the first gap 48. As a result, the capacitances that are respectively provided in two pairs of fixed and movable electrodes 56 and 58 facing each other in the direction of the second axis (Y axis), change in a mode corresponding to each other. The first detecting section 24 detects the changes in the corresponding mode in the capacitances, and outputs a detection value representing the displacement of the first movable part 14 relative to the fixed part 12 in the direction of the second axis (Y axis).

When the first movable part 14 is displaced relative to the fixed part 12 in the rotational direction about the third axis (Z axis), the first fixed surface 52a and the first movable surface 54a, which oppose each other in the direction of the first axis (X axis), are tilted relative to each other, and the first fixed surface 52a and the first movable surface 54a, which oppose each other in the direction of the second axis (Y axis), are also tilted relative to each other, so that each first gap 48 decreases at one end and increases at the other end as viewed in the longitudinal direction of the fixed electrode 56 or the movable electrode 58. As a result, the capacitances that are respectively provided in two pairs of fixed and movable electrodes 56 and 58 facing each other in the direction of the first axis (X axis), change in modes different from each other, and the capacitances that are respectively provided in two pairs of fixed and movable electrodes 56 and 58 facing each other in the direction of the second axis (Y axis), also change in modes different from each other. The first detecting section 24 detects the changes in the different modes in the capacitances, and outputs a detection value representing the displacement of the first movable part 14 relative to the fixed part 12 in the rotational direction about the third axis (Z axis).

When the first movable part 14 is displaced relative to the fixed part 12 in a direction that is a composition of two or more directions, from among the direction of the first axis (X axis), the direction of the second axis (Y axis) and the rotational direction about the third axis (Z axis), the first detecting section 24 can likewise detect the changes in the capacitances respectively provided in two pairs of fixed and movable electrodes 56 and 58 facing each other in the direction of the first axis (X axis) and the changes in the capacitances respectively provided in two pairs of fixed and movable electrodes 56 and 58 facing each other in the direction of the second axis (Y axis), and can output detection values representing a component in the direction of the first axis (X axis), a component in the direction of the second axis (Y axis) and a component in the rotational direction about the third axis (Z axis), of the displacement of the first movable part 14.

The first detecting section 24 has a configuration for detecting the displacements of the first movable part 14 relative to the fixed part 12 in the direction parallel to the first axis (X axis), the direction parallel to the second axis (Y axis) and the rotational direction about the third axis (Z axis). Accordingly, if at least three capacitances are provided in two first gaps 48, the displacement in each axis direction can be detected. For example, either one of two pairs of opposing first fixed and movable surfaces 52a and 54a may include only one pair of opposing fixed and movable electrodes 56 and 58 so as to form a single capacitance. Alternatively, one pair of opposing first fixed and movable surfaces 52a and 54a may be provided with three or more pairs of opposing fixed and movable electrodes 56 and 58, or three or more pairs of opposing fixed and movable blocks 52 and 54 may be formed, so as to form a total of five or more capacitances. Furthermore, one of the opposing fixed and movable electrodes 56 and 58 formed in one pair of first fixed and movable surfaces 52a and 54a may be formed as a single large-size electrode to which a common electric potential is applied, and the other may be formed as two or more small-size electrodes to which respective electrical potentials are applied, the function of which is equivalent to that of the example of FIG. 7A. Alternatively, such a large-size electrode may be omitted, and either one of the first fixed surface 52a and the first movable surface 54a may be provided with ground potential.

Figure 8:
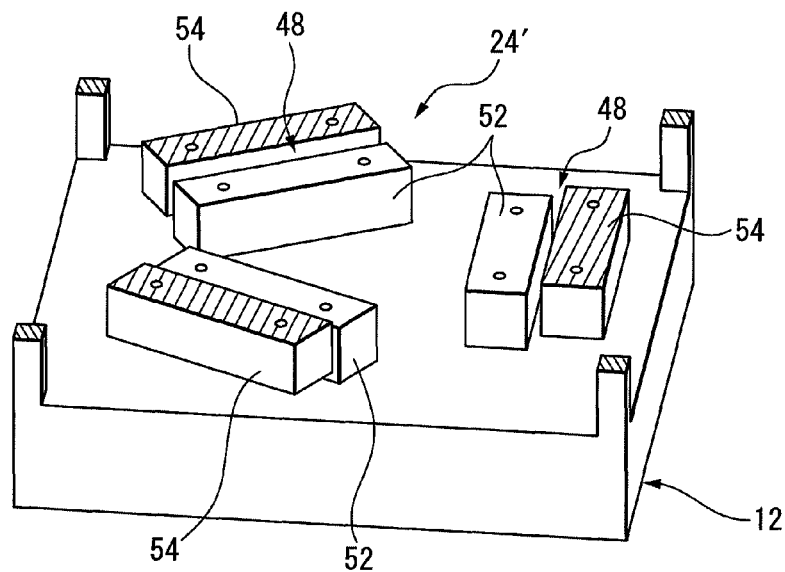
FIG. 8 is a cutaway perspective view showing a first detecting section according to a modified example.

FIG. 8 shows the configuration of a first detecting section 24' according to a modified example which includes three pairs of opposing fixed and movable blocks 52 and 54. In this modified example, three fixed blocks 54 are disposed at predetermined positions on the surface 12a of the fixed part 12, and three movable blocks 54 are disposed at predetermined positions on the surface 28a (FIG. 4) of the first portion 28 of the first movable part 14. Each fixed block 52 includes a first fixed surface 52a (FIG. 6) which extends along a virtual plane containing the third axis (Z axis). The first fixed surface 52a of one fixed block 52 and the first fixed surface 52a of another one of the fixed blocks 52 extend in directions intersecting each other at an angle of 60 degrees. Each movable block 54 includes a first movable surface 54a (FIG. 6) which extends along a virtual plane containing the third axis (Z axis). The first movable surface 54a of one movable block 54 and the first movable surface 54a of another one of the movable blocks 54 extend in directions intersecting each other at an angle of 60 degrees. Each of the three first movable surfaces 54a is disposed so as to extend in parallel in opposed relationship to a corresponding one of the three first fixed surfaces 52a that extends along the same virtual plane. The first gap 48 is formed between the first fixed surface 52a and the first movable surface 54a in each of the three pairs of opposing surfaces.

In the modified example shown in FIG. 8, one pair of opposing fixed and movable electrodes 56 and 58 (FIG. 6) may be formed in each of the three first gaps 48, so that a total of three capacitances can be provided. The first detecting section 24' can detect the displacements of the first movable part 14 relative to the fixed part 12, in the direction of the first axis (X axis), in the direction of the second axis (Y axis) and in the rotational direction about the third axis (Z axis), based on changes in the capacitances provided in three pairs of fixed and movable electrodes 56 and 58.

The fixed electrode 56 and the movable electrode 58 may each be formed using, for example, a flexible printed circuit, and may be laminated to the first fixed surface 52a and the first movable surface 54a, respectively. Alternatively, the fixed electrode 56 and the movable electrode 58 may be formed using various other methods such as vapor deposition and conductive ink printing. The fixed block 52 may be formed integral to the fixed part 12 or may be formed separately from the fixed part 12 and attached to the fixed part 12. Likewise, the movable block 54 may be formed integral to the first portion 28 of the first movable part 14 or may be formed separately from the first portion 28 and attached to the first portion 28. In either case, the fixed block 52 and the movable block 54 are at least formed from an electrically insulating material or electrically insulated from the fixed electrode 56 and the movable electrode 58, respectively. However, when connecting the first fixed surface 52a or the first movable surface 54a to ground potential, the fixed block 52 or the movable block 54 may be formed from a metal.

When at least either the fixed block 52 or the movable block 54 is formed as a block separate from at least either the fixed part 12 or the first portion 28, the formation of the first gap 48 can be facilitated. For example, first the fixed block 52 is attached to a predetermined position on the surface 12a of the fixed part 12 and fixed in position, and then the movable block 54 is positioned with a thin plate of predetermined thickness sandwiched between the first fixed surface 52a and the first movable surface 54a; in this condition, the movable block 54 is attached to the surface 28a of the first portion 28 and fixed in position. When the thin plate is removed after fixing the movable block 54, the first gap 48 of a dimension corresponding to the thickness of the thin plate is formed.

Next, the configuration of the second detecting section 26 will be described in detail with reference to FIGS. 2, 3 and 7B.

The first movable part 14 includes a second fixed surface 32a, which is the surface 32a of the third portion 32, and which extends along a virtual plane perpendicular to the third axis (Z axis). The second movable part 20 includes a second movable surface 40a, which is the surface 40a of the base-plate portion 40, and which extends along a virtual plane perpendicular to the third axis (Z axis) when none of the second connecting parts 22 are bent. The second movable surface 40a is disposed at a position allowing it to face in parallel to the second fixed surface 32a. When none of the second connecting parts 22 are bent, the second fixed surface 32a and the second movable surface 40a face in parallel to each other in the direction of the third axis (Z axis). The second gap 50 is formed between the second fixed surface 32a and the second movable surface 40a, opposing each other. In this connection, the term "second fixed surface 32a" explains a motional relationship relative to the second movable surface 40a and, unlike the aforementioned first "fixed" surface 52a, does not mean a permanently fixed surface in the six-axis force sensor 10.

The second detecting section 26 includes a total of at least three capacitance-forming portions that are electrically independent from each other and provided in the second gap 50. Each capacitance-forming portion is configured from a fixed electrode 60 formed on the second fixed surface 32a and a movable electrode 62 formed on the second movable surface 40a. The second gap 50 provides electrical insulation between the opposing fixed and movable electrodes 60 and 62. A predetermined capacitance is formed in the second gap 50 by the opposing fixed and movable electrodes 60 and 62.

In this connection, the term "fixed electrode 60" explains a motional relationship relative to the movable electrode 62 and, unlike the aforementioned "fixed" electrode 56, does not mean a permanently fixed electrode in the six-axis force sensor 10.

Figure 7B:
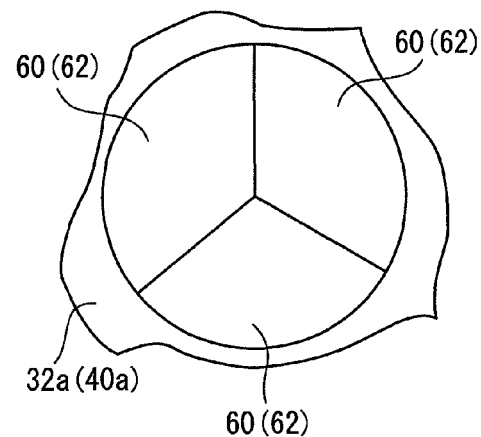
FIG. 7B is a diagram showing the configuration of electrodes, constituting a second detecting section, that can be provided in the six-axis force sensor of FIG. 1.

FIG. 7B shows one exemplary configuration of the fixed electrode 60 formed on the second fixed surface 32a, or of the movable electrode 62 formed on the second movable surface 40a. In this example, three fixed electrodes 60, each having a fan-shaped profile and adjacent to one another in a circumferential direction, are formed on the second fixed surface 32a. The fixed electrodes 60 have a profile identical to one another and defining a center angle of 120 degrees, and are arranged, in the form of a circle, to be electrically insulated from one another. Likewise, three movable electrodes 62, each having a fan-shaped profile and adjacent to one another in a circumferential direction, are formed on the second movable surface 40a. The movable electrodes 62 have a profile identical to one another and defining a center angle of 120 degrees, and are arranged, in the form of a circle, to be electrically insulated from one another. The fixed electrode 60 and the movable electrode 62 have a profile identical to each other. The fixed electrode 60 and the opposing movable electrode 62 are disposed at respective positions allowing the profiles thereof to be registered with each other as seen in the opposing direction, when none of the first connecting parts 18 are bent. A total of three pairs of opposing fixed and movable electrodes 60 and 62 provide a total of three capacitances in the second gap 50.

In the six-axis force sensor 10 provided with the capacitance-forming portions according to the example of FIG. 7B, when the second movable part 20 is displaced relative to the first movable part 14 in the direction of the third axis (Z axis), the second fixed surface 32a and the second movable surface 40a, which oppose each other in the direction of the third axis (Z axis), are translated (or subjected to a parallel displacement) relative to each other in a direction toward or away from each other, so as to uniformly decrease or increase the second gap 50. As a result, the capacitances respectively provided in three pairs of fixed and movable electrodes 60 and 62 change in a mode corresponding to each other. The second detecting section 26 detects the changes in the corresponding mode in the capacitances, and outputs a detection value representing the displacement of the second movable part 20 relative to the first movable part 14 in the direction of the third axis (Z axis).

When the second movable part 20 is displaced relative to the first movable part 14 in the rotational direction about the first axis (X axis) or the second axis (Y axis), the second fixed surface 32a and the second movable surface 40a are tilted relative to each other, so that the second gap 50 decreases at one end and increases at the other end as viewed in the radial direction of the fixed electrode 60 or the movable electrode 62. As a result, the capacitances respectively provided in three pairs of fixed and movable electrodes 60 and 62 facing each other in the direction of the third axis (Z axis), change in modes different from one another. The second detecting section 26 detects the changes in the different modes in the capacitances, and outputs a detection value representing the displacement of the second movable part 20 relative to the first movable part 14 in the rotational direction about the first axis (X axis) or the second axis (Y axis).

When the second movable part 20 is displaced relative to the first movable part 14 in a direction that is a composition of two or more directions, from among the rotational direction about the first axis (X axis), the rotational direction about the second axis (Y axis) and the direction of the third axis (Z axis), the second detecting section 26 can likewise detect the changes in the capacitances respectively provided in three pairs of fixed and movable electrodes 60 and 62 facing each other in the direction of the third axis (Z axis), and can output detection values representing a component in the rotational direction about the first axis (X axis), a component in the rotational direction about the second axis (Y axis) and a component in the direction of the third axis (Z axis), of the displacement of the second movable part 20.

The second detecting section 26 has a configuration for detecting the displacements of the second movable part 20 relative to the first movable part 14 in the rotational direction about the first axis (X axis), the rotational direction about the second axis (Y axis) and the direction parallel to the third axis (Z axis). Accordingly, if at least three capacitances are provided in the second gap 50, the displacement in each axis direction can be detected. For example, four or more capacitances may be formed by forming four or more pairs of opposing fixed and movable electrodes 60 and 62 on the second fixed surface 32a and the second movable surface 40a. Further, the fixed and movable electrodes 60 and 62 may have any shape other than the illustrated fan shape, and may have any arrangement other than the illustrated circular arrangement. Furthermore, one of the fixed electrode 60 formed on the second fixed surface 32a and the movable electrode 62 formed on the second movable surface 40a, may be formed as a single large-size electrode to which a common electric potential is applied, and the other may be formed as three or more small-size electrodes to which respective electrical potentials are applied, the function of which is equivalent to that of the example of FIG. 7B. Alternatively, such a large-size electrode may be omitted, and either one of the second fixed surface 32a and the second movable surface 40a may be provided with ground potential, so as to provide a capacitance.

The fixed electrode 60 and the movable electrode 62 may each be formed using, for example, a flexible printed circuit, and may be laminated to the second fixed surface 32a and the second movable surface 40a, respectively. Alternatively, the fixed electrode 60 and the movable electrode 62 may be formed using various other methods such as vapor deposition and conductive ink printing. The third portion 32 of the first movable part 14 and the base-plate portion 40 of the second movable part 20 are either formed from an electrically insulating material or electrically insulated from the fixed electrode 60 and the movable electrode 62, respectively. However, when connecting the second fixed surface 32a or the second movable surface 40a to ground potential, the third portion 32 or the base-plate portion 40 may be formed from a metal. The second gap 50 can be maintained at a desired dimension by inserting the spacers 39 for forming the space 38 between the second and third portions 30 and 32 of the first movable part 14 (or by providing protrusions having the equivalent function).

The six-axis force sensor 10 is configured to enable a detection of a force component in the direction of the first axis (X axis, in the drawing), a force component in the direction of the second axis (Y axis, in the drawing), a force component in the direction of the third axis (Z axis, in the drawing), a moment component about the first axis, a moment component about the second axis and a moment component about the third axis, of a force applied to the second movable part 20, with reference to the aforementioned detection value of displacement detected by the first detecting section 24 and the aforementioned detection value of displacement detected by the second detecting section 26.

The detection of the force components and the moment components may be accomplished by a calculating apparatus provided separately from the six-axis force sensor 10. Alternatively, as shown in FIG. 1, the six-axis force sensor 10 may include a calculating section 64 configured to calculate the force component in the direction of the first axis (X axis, in the drawing), the force component in the direction of the second axis (Y axis, in the drawing), the force component in the direction of the third axis (Z axis, in the drawing), the moment component about the first axis, the moment component about the second axis and the moment component about the third axis, of the force applied to the second movable part 20, based on the detection value of displacement detected by the first detecting section 24 and the detection value of displacement detected by the second detecting section 26.

The force components and moment components can be calculated from the displacement detection value by using, for example, a method that performs a matrix calculation between the displacement detection value and a transform coefficient matrix obtained in advance. The transform coefficient matrix can be obtained using a known mathematical method by applying a known load to the six-axis force sensor 10 in various directions and by collecting displacement data corresponding to the force and moment components of the applied load along the six axes. Since the capacitance is inversely proportional to the distance between the fixed electrode 56, 60 and the movable electrode 58, 62, the first detecting section 24 and the second detecting section 26 each can obtain the displacement of the first movable part 14 or the second movable part 20 from the reciprocal of the detected amount of change in capacitance and can output the result as the detection value. However, using a known mathematical method, the calculating section 64, for example, may directly obtain the force components and moment components, based on the raw data representing the amount of change in capacitance detected by each of the first and second detecting sections 24 and 26 (i.e., based on the detection value of the capacitance). In that case, the first and second detecting sections 24 and 26 each output the detected amount of change in capacitance as the detection value. In the present embodiment, it is to be understood that "the first and second detecting sections 24 and 26 detecting the change in capacitance" means the same thing, from a mathematical point of view, as "the first and second detecting sections 24 and 26 detecting the displacement of the corresponding movable part 14, 20".

The six-axis force sensor 10 according to the first embodiment has a configuration in which the fixed part 12 and the first movable part 14 are connected by the first connecting parts 18 in such a manner that the first movable part 14 can be displaced in a mode with three degrees of freedom; the first movable part 14 and the second movable part 20 are connected by the second connecting parts 22 in such a manner that the second movable part 20 can be displaced in a mode with three degrees of freedom, which is different from the displacement mode of the first movable part 14; the first detecting section 24 detects the displacement of the first movable part 14 relative to the fixed part 12; and the second detecting section 26 different from the first detecting section 24 detects the displacement of the second movable part 20 relative to the first movable part 14. Since the respective displacements in six axes can be detected by the first and second detecting sections 24 and 26 with one section detecting shearing a detection in relation to three degrees of freedom with the other detecting section, the displacements are able to be detected with high accuracy. Since each of the constituent part that causes the displacement to be detected by the first detecting section 24 and the constituent part that causes the displacement to be detected by the second detecting section 26 may have a configuration that allows displacements with only three degrees of freedom, and since the first movable part 14 is common to both constituent parts, the structure of the six-axis force sensor 10 is simplified, the processing and assembly of the components are facilitated, and a reduction in fabrication cost is achieved.

In particular, the six-axis force sensor 10 has a configuration in which the first gap 48 is defined between the fixed part 12 and the first movable part 14 and any change in capacitance in the first gap 48 is detected by the first detecting section 24; the second gap 50 is defined between the first movable part 14 and the second movable part 20 and any change in capacitance in the second gap 50 is detected by the second detecting section 26; and therefore the first gap 48 and the second gap 50 can be defined separately with good accuracy. As a result, the change in capacitance in each of the first and second gaps 48 and 50 can be detected with high accuracy, and therefore the displacement of the first movable part 14 relative to the fixed part 12 and the displacement of the second movable part 20 relative to the first movable part 14 can be respectively detected with high accuracy.

Figure 9:
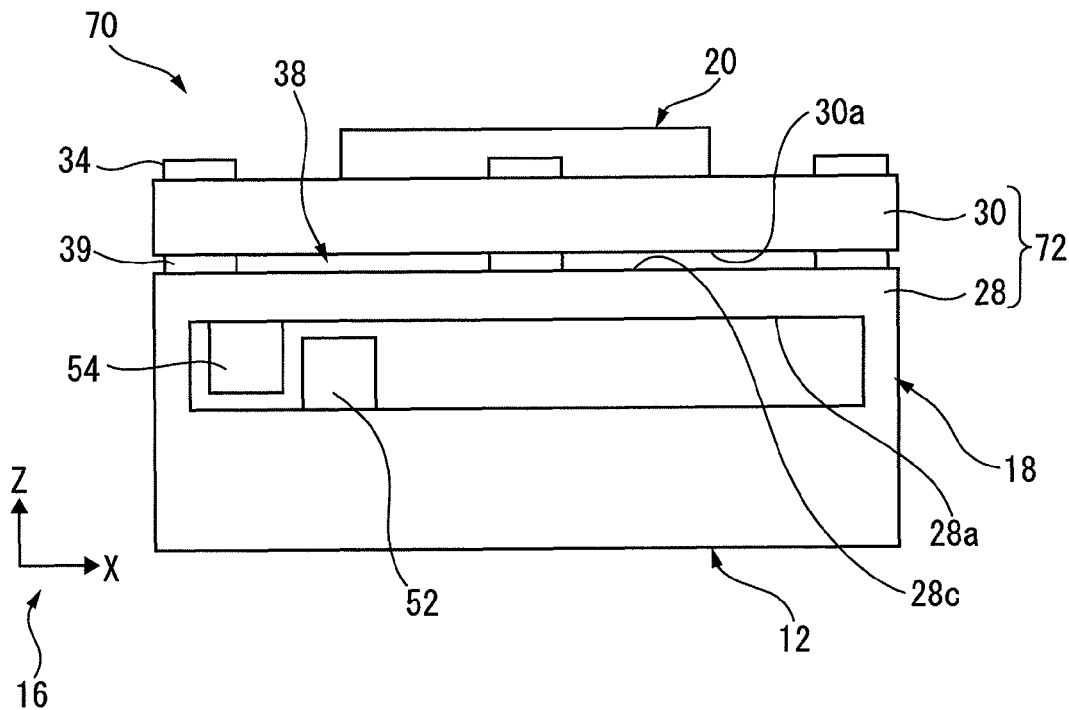
FIG. 9 is a front view of a six-axis force sensor according to a second embodiment.
Figure 10:
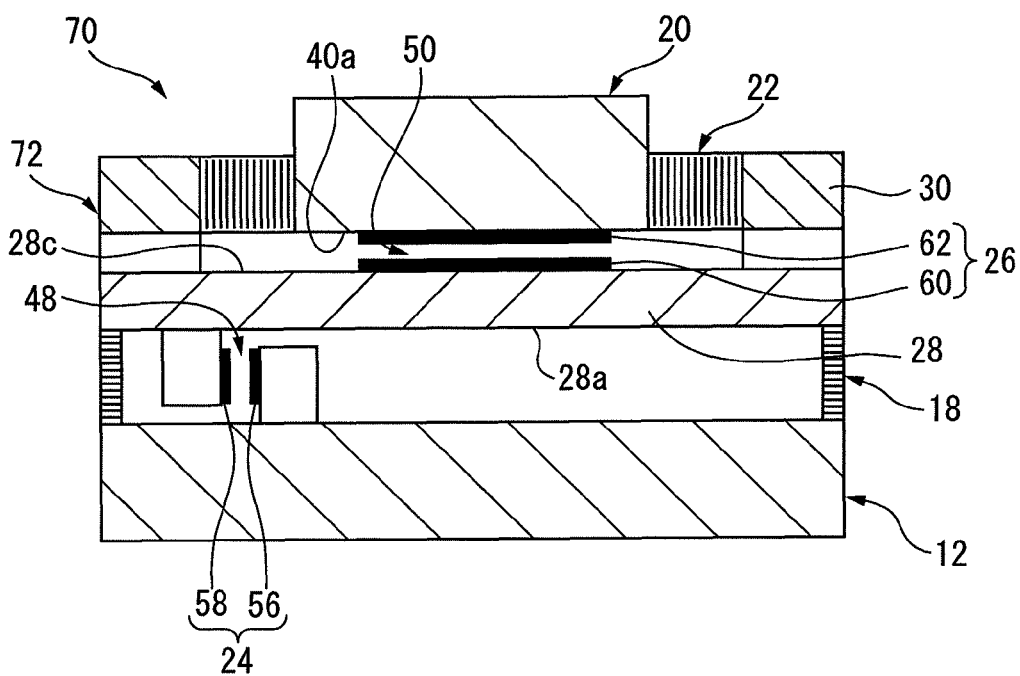
FIG. 10 is a sectional view showing in conceptual form the construction of the six-axis force sensor of FIG. 9.

FIGS. 9 and 10 depict a six-axis force sensor 70 according to a second embodiment. The six-axis force sensor 70 is identical in configuration to the six-axis force sensor 10, except that the third portion 32 of the first movable part 14 in the six-axis force sensor 10 is omitted. Therefore, corresponding components are designated by like reference numerals, and the description of such components is not repeated.

The six-axis force sensor 70 includes a fixed part 12, a first movable part 72, a first connecting part 18, a second movable part 20, a second connecting part 22, a first detecting section 24 and a second detecting section 26. The first movable part 72 includes a rectangular flat plate-like first portion 28 and a rectangular frame-like second portion 30. The first portion 28 and the second portion 30 are formed separately from each other and integrally fastened together. The first portion 28 and the second portion 30 may be fastened together, for example, by a bolt 34. The surface 28c of the first portion 28, extending on the side (upper side, in the drawing) opposite to the surface 28a, faces the surface 30a of the second portion 30 with a space 38 defined therebetween.

The first movable part 72 includes a second fixed surface 28c, which is a surface 28c of the first portion 28, and which extends along a virtual plane perpendicular to the third axis (Z axis). The second movable surface 40a, which is the surface 40a of the second movable part 20, is disposed at a position allowing the second movable surface 40a to face in parallel to the second fixed surface 28c. When none of the second connecting parts 22 are bent, the second fixed surface 28c and the second movable surface 40a face in parallel to each other in the direction of the third axis (Z axis). The second gap 50 is formed between the second fixed surface 28c and the second movable surface 40a, which face each other. Each of at least three capacitance-forming portions provided in the second gap 50 includes a fixed electrode 60 formed on the second fixed surface 28c and a movable electrode 62 formed on the second movable surface 40a. The second gap 50 can be ensured at a desired size by the spacers 39 for forming the space 38 between the first and second portions 28 and 30 of the first movable part 14 (or by protrusions having the equivalent function).

The six-axis force sensor 70 according to the second embodiment operates in the same manner as the six-axis force sensor 10 according to the first embodiment so as to enable a detection of a force component in the direction of the first axis (X axis), a force component in the direction of the second axis (Y axis), a force component in the direction of the third axis (Z axis), a moment component about the first axis, a moment component about the second axis and a moment component about the third axis, of a force applied to the second movable part 20, with reference to the detection value of the first detecting section 24 and the detection value of the second detecting section 26. The six-axis force sensor 70 having the above configuration offers an effect equivalent to the aforementioned effect of the six-axis force sensor 10. Further, in the six-axis force sensor 70, since the configuration of the first movable part 72 is simplified in comparison with that of the first movable part 14, it is able to achieve a further reduction in fabrication cost.

While the configurations of the various embodiments of the present invention have been described above with reference to the accompanying drawings, the present invention is not limited to any particular configuration illustrated herein. For example, the first detecting section and the second detecting section need not be limited to the illustrated configuration that detects a displacement from a change in capacitance, but may be implemented by a configuration that uses a displacement detecting means of other suitable type such as an optical or magnetic type. In this way, it will be understood by those skilled in the art that various modifications and changes can be made without departing from the scope of the invention as defined by the appended claims.

The invention claimed is:

1. A six-axis force sensor comprising:
   a fixed part including a first fixed surface;
   a first movable part including a first movable surface and a second fixed surface, the first movable surface facing the first fixed surface;
   a first connecting part configured to connect said first movable part to said fixed part so that the first movable part is able to be elastically displaced in a direction parallel to a first axis, a direction parallel to a second axis orthogonal to the first axis and a rotational direction about a third axis orthogonal to both of the first axis and the second axis, in a three-axis rectangular coordinate system;
   a second movable part including a second movable surface facing the second fixed surface;
   a second connecting part configured to connect said second movable part to said first movable part so that the second movable part is able to be elastically displaced in a rotational direction about said first axis, a rotational direction about said second axis and a direction parallel to said third axis, in said three-axis rectangular coordinate system;
   a first detecting section configured to detect a displacement of said first movable part relative to said fixed part based on a relative displacement between the first fixed surface and the first movable surface; and
   a second detecting section configured to detect a displacement of said second movable part relative to said first movable part based on a relative displacement between the second fixed surface and the second movable surface;
   wherein the six-axis force sensor enables a detection of a force component in a direction of said first axis, a force component in a direction of said second axis, a force component in a direction of said third axis, a moment component about said first axis, a moment component about said second axis and a moment component about said third axis, of a force applied to said second movable part, with reference to a detection value of said first detecting section and a detection value of said second detecting section.

2. The six-axis force sensor of claim 1, further comprising a calculating section configured to calculate the force component in the direction of said first axis, the force component in the direction of said second axis, the force component in the direction of said third axis, the moment component about said first axis, the moment component about said second axis and the moment component about said third axis, of the force applied to said second movable part, based on the detection value of said first detecting section and the detection value of said second detecting section.

3. The six-axis force sensor of claim 1, wherein a first gap with a capacitance is defined between said first fixed surface and said first movable surface, and wherein said first detecting section is configured to detect a change in the capacitance of the first gap so as to detect said displacement of said first movable part.

4. The six-axis force sensor of claim 3, wherein said fixed part includes a plurality of first fixed surfaces that extend along virtual planes containing said third axis and in directions intersecting each other at an angle not less than 60 degrees, wherein said first movable part includes a plurality of first movable surfaces that are positioned so as to respectively face in parallel to the plurality of first fixed surfaces and extend in directions intersecting each other at an angle not less than 60 degrees, and wherein said first gap is defined between each first fixed surface and each first movable surface, which constitute each of pairs of opposed surfaces.

5. The six-axis force sensor of claim 4, wherein said first detecting section includes at least three capacitance-forming portions that are electrically independent from each other and provided in a plurality of first gaps.

6. The six-axis force sensor of claim 1, wherein a second gap with a capacitance is defined between said second fixed surface and said second movable surface, and wherein said second detecting section is configured to detect a change in the capacitance of the second gap so as to detect said displacement of said second movable part.

7. The six-axis force sensor of claim 6, wherein said first movable part includes said second fixed surface that extends along a virtual plane perpendicular to said third axis, wherein said second movable part includes said second movable surface that is positioned so as to face in parallel to the second fixed surface, and wherein said second gap is defined between the second fixed surface and the second movable surface.

8. The six-axis force sensor of claim 7, wherein said second detecting section includes at least three capacitance-forming portions that are electrically independent from each other and provided in the second gap.

9. The six-axis force sensor of claim 1, wherein said first movable part includes a first portion formed integrally with said first connecting part as a unitary structure, and a second portion formed separately from and securely attached to the first portion, the second portion being formed integrally with said second connecting part as a unitary structure.

10. The six-axis force sensor of claim 9, wherein said first movable part includes a third portion interposed between said first portion and said second portion, the third portion being formed separately from and securely attached to said first portion and said second portion.

11. The six-axis force sensor of claim 1, wherein said first connecting part includes a plurality of elastic beams extending between said fixed part and said first movable part.

12. The six-axis force sensor of claim 1, wherein said second connecting part includes a plurality of elastic beams extending between said first movable part and said second movable part.

* * * * *